Jan. 16, 1934.  O. F. KENDLER  1,943,324
AUTOMATIC TORQUE ADJUSTER
Filed May 11, 1933   5 Sheets-Sheet 1
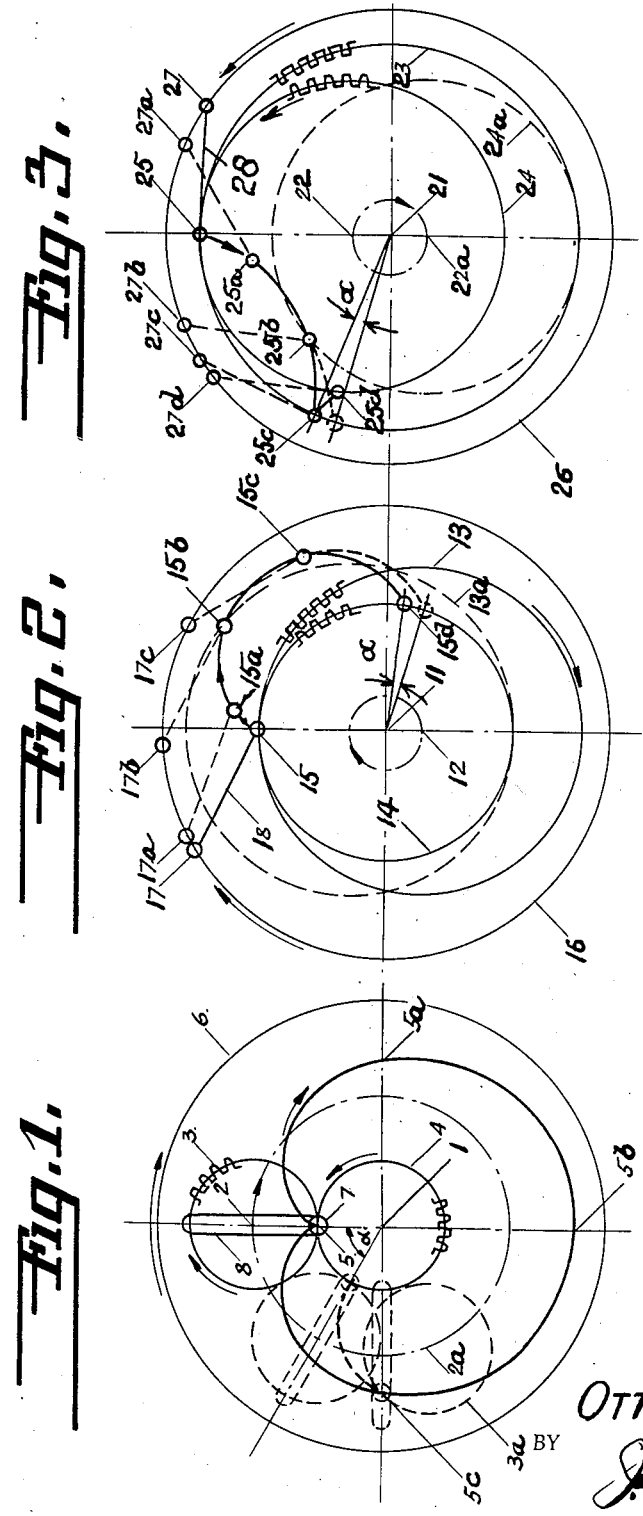
INVENTOR.
OTTO F. KENDLER
BY
ATTORNEY.

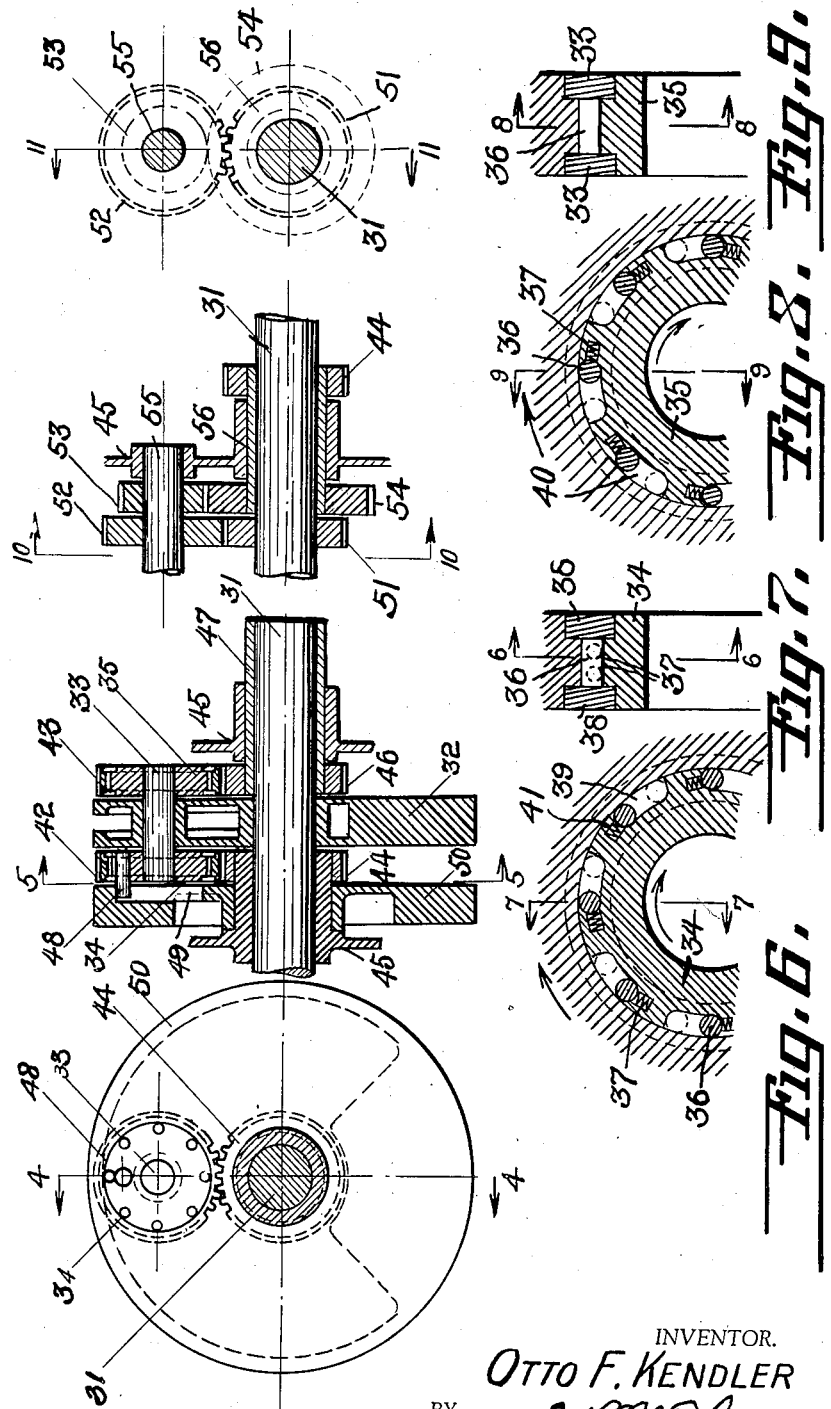

Jan. 16, 1934.  O. F. KENDLER  1,943,324
AUTOMATIC TORQUE ADJUSTER
Filed May 11, 1933   5 Sheets-Sheet 3
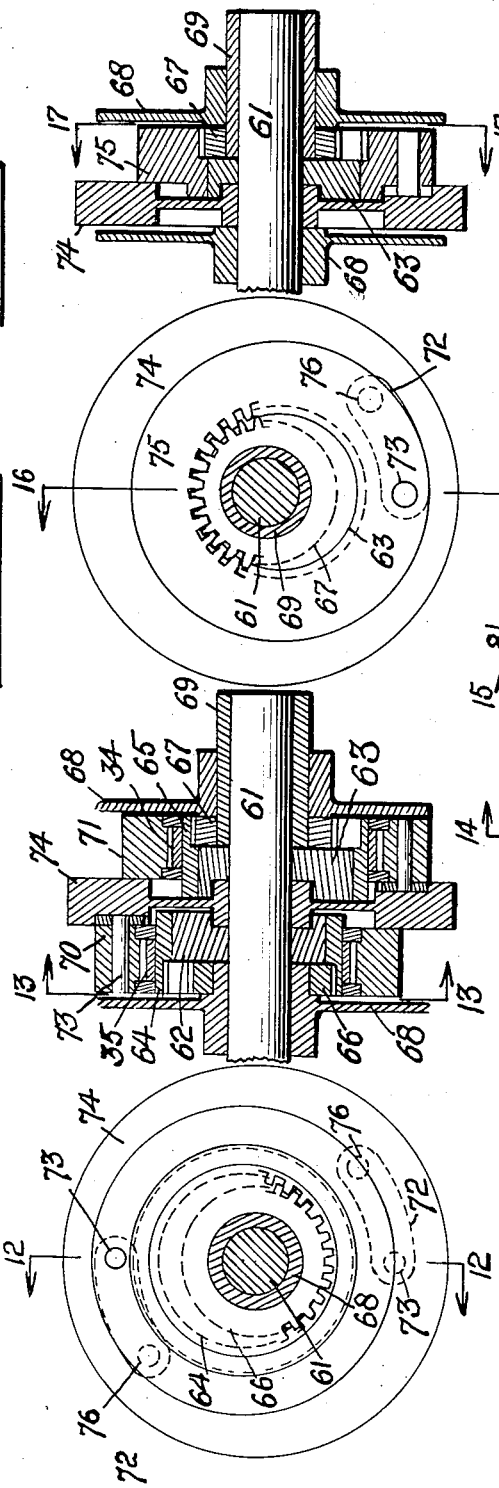
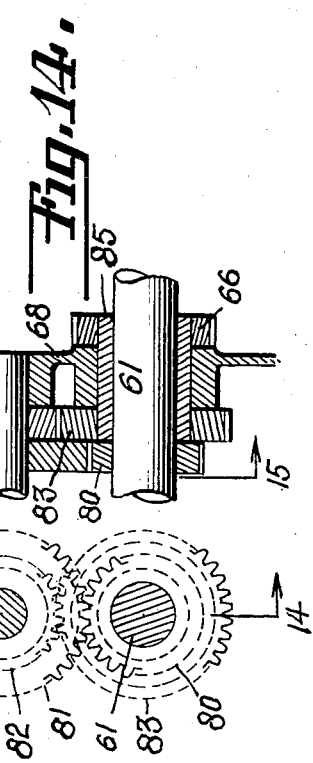
INVENTOR.
OTTO F. KENDLER.
BY
ATTORNEY.

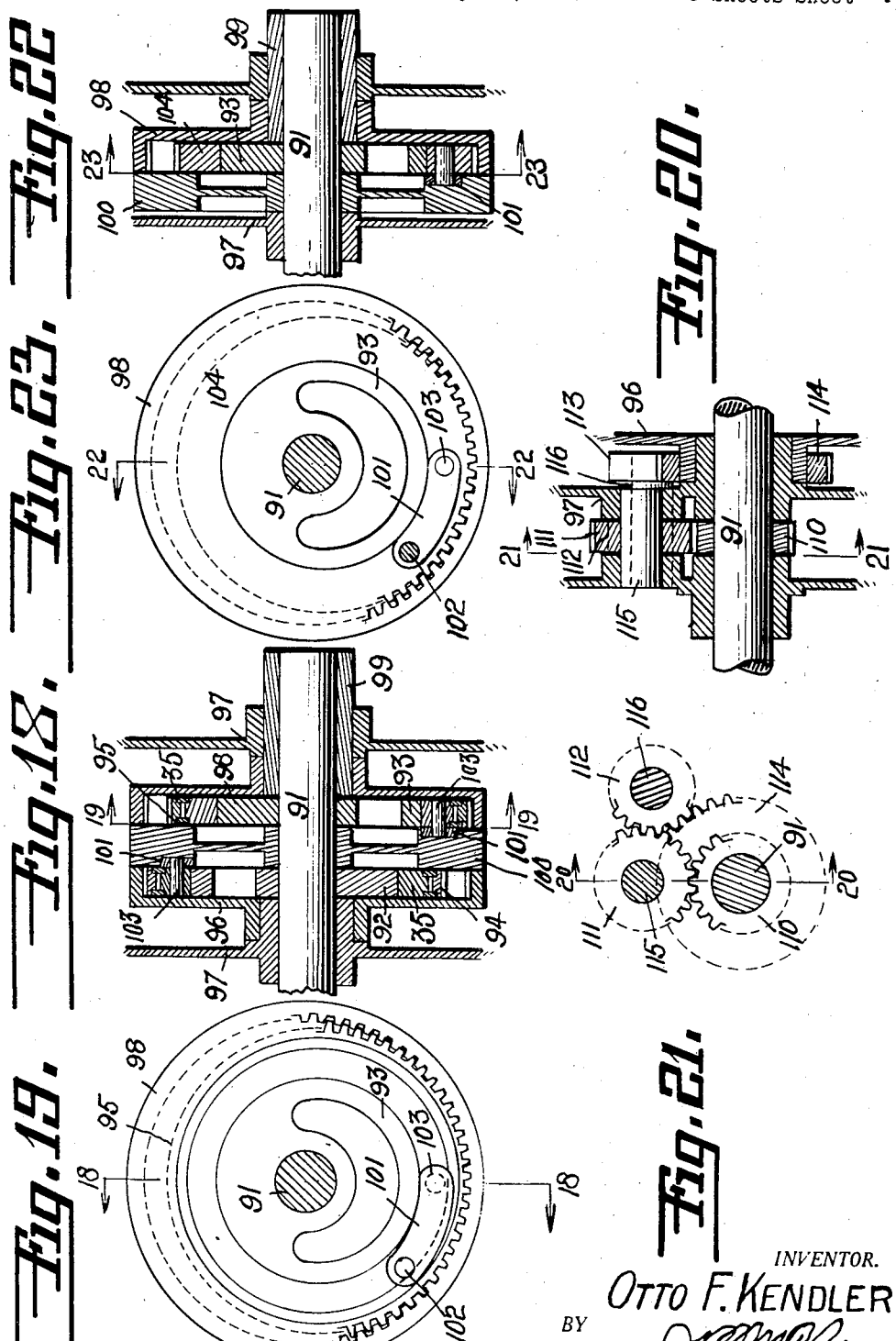

Jan. 16, 1934. O. F. KENDLER 1,943,324
AUTOMATIC TORQUE ADJUSTER
Filed May 11, 1933 5 Sheets-Sheet 5
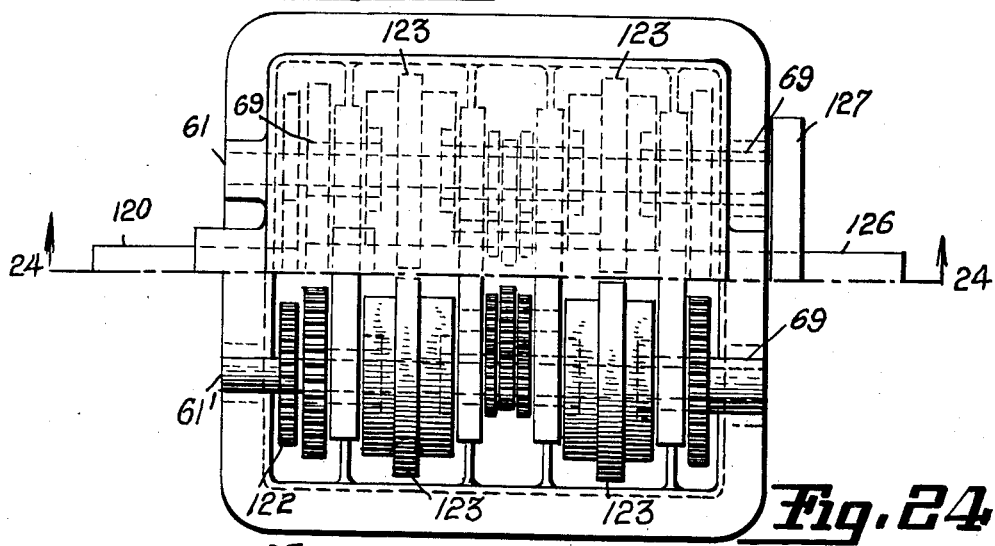
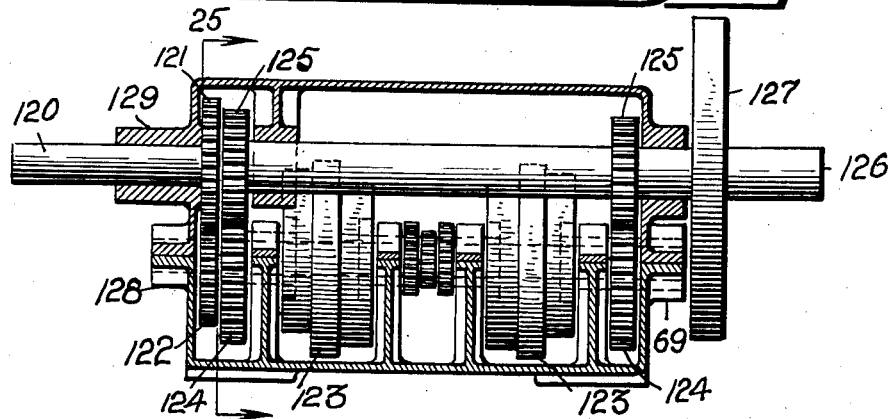
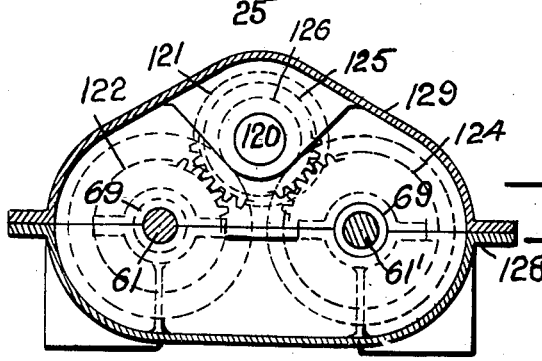
INVENTOR.
OTTO F. KENDLER.
BY
ATTORNEY.

Patented Jan. 16, 1934

1,943,324

UNITED STATES PATENT OFFICE 1,943,324

AUTOMATIC TORQUE ADJUSTER

Otto F. Kendler, New York, N. Y.

Application May 11, 1933. Serial No. 670,421

18 Claims. (Cl. 74—34)

My invention relates to an automatic torque adjuster or transmission device, and particularly to means for supplying a load shaft with energy of variable torque and speed from a power source of a different or constant torque and speed.

More particularly, the automatic torque adjuster relates to variable speed transmissions of infinite ratio and ratio variable in any degree, which is practical, sturdy, flexible and efficient.

Some of the most important uses of the automatic torque adjuster are: First, for coupling electric motors to their loads, thus avoiding the oversize needed for starting torque and allowing the motor to obtain its proper speed without any load throwing in the transmission; second, for splitting the power of the prime mover into any number of equal or different predetermined flexible power sources; and, third, for transmission of torque which changes automatically in accordance with the resisting torque, as required in automobiles, tractors, military tanks, oil well drills, etc.

The invention as disclosed in the accompanying specification and illustrated in the drawings attached thereto, proposes to arrange the torque mechanism so as to be varied in three ways, yet any one of which would function between the drive and the driven apparatus.

Further objects and advantages of my invention, more or less broader than those heretofore stated, will be partly obvious and in part specially pointed out. My invention as at present preferred will be more fully understood by reference to the drawings which illustrate merely examples of means for putting my invention into practice, and wherein:

Fig. 1 is a diagrammatic illustration of the motion of kinetic coupling employing two external gears in mesh, with one mounted concentrically and the other eccentrically with driving and driven shafts of the conversion medium; Fig. 2 is a diagrammatic illustration of the motion of kinetic coupling employing an internal gear mounted on an eccentric and in mesh with an external gear mounted concentrically with driving and driven shafts of the conversion medium; Fig. 3 is a diagrammatic illustration of the motion of kinetic coupling employing an external gear mounted on an eccentric and in mesh with an internal gear mounted concentrically with driving and driven shafts of the conversion medium; Fig. 4 is a longitudinal section of conversion medium taken on lines 4—4 of Fig. 5; Fig. 5 is a cross section of conversion medium taken on lines 5—5 of Fig. 4; Fig. 6 is a longitudinal section of overrunning clutch taken on lines 6—6 of Fig. 7; Fig. 7 is a cross section of clutch taken on lines 7—7 of Fig. 6; Fig. 8 is a longitudinal section of the overrunning clutch, taken on lines 8—8 of Fig. 9; Fig. 9 is a cross section of clutch taken on lines 9—9 of Fig. 8; Fig. 10 is a face view of the drive for conversion medium shown in Fig. 1, looking in direction of arrow 10—10 of Fig. 11; Fig. 11 is a longitudinal section of drive for conversion medium taken on lines 11—11 of Fig. 10; Fig. 12 is a longitudinal section of conversion medium shown in Fig. 2, taken on lines 12—12 of Fig. 13; Fig. 13 is a cross section of conversion medium of the same, looking in direction of arrow 13—13 of Fig. 12; Fig. 14 is a longitudinal section of drive described in Fig. 2 for conversion medium taken on line 14—14 of Fig. 15; Fig. 15 is a face view of Fig. 14, looking in direction of arrow 15—15 of Fig. 14; Fig. 16 is a longitudinal section of conversion medium described in Fig. 2, taken on lines 16—16 of Fig. 17; Fig. 17 is a cross section of the same taken on lines 17—17 of Fig. 16; Fig. 18 is a longitudinal section of conversion medium described in Fig. 3, taken on lines 18—18 of Fig. 19; Fig. 19 is a cross section of the same looking in the direction of arrows 19—19 of Fig. 18; Fig. 20 is a longitudinal section of drive for conversion medium described in Fig. 3, taken on lines 20—20 of Fig. 21; Fig. 21 is a cross section of drive for conversion medium looking in direction of arrows 21—21 of Fig. 20; Fig. 22 is a longitudinal section of conversion medium described in Fig. 3 and taken on lines 22—22 of Fig. 23; Fig. 23 is a cross section of the same looking in direction of arrow 23—23 of Fig. 22; Fig. 24 is a longitudinal section of automatic torque adjuster, employing four conversion mediums taken on lines 24—24 of Fig. 26; Fig. 25 is a cross section of the same taken on lines 25—25 of Fig. 24; and Fig. 26 is a plan view of my device assembled in a case, showing one-half of the cover removed and the other part thereon.

The basic principles of the invention are: firstly, the conversion of the work done by a prime mover into kinetic energy of rotation of masses; and secondly, the transmission of the obtained energy to the driven shaft in accordance with the resisting torque.

In its basic form the invention comprises a driving shaft, a power conversion medium and a driven or load shaft, substantially in alignment and abutting each other. The power conversion medium consists of three parts:—the charging mechanism, the inertia mass, and the discharging mechanism. The charging mechanism may be developed to combine the functions of the charging and discharging mechanisms.

By means of the charging mechanism the power of the prime mover is expended on acceleration of the inertia mass in a curved path, called "the acceleration curve." By means of the discharging mechanism, the obtained kinetic energy of rotation of the inertia mass is transmitted to the driven shaft.

Since the kinetic energy of rotation of a body moving in a curved path is directly proportional to the square of the speed of the movement in the path, the turning moment exerted by the inertia mass is also proportional to the square of the speed of the mass. Consequently, if an adjuster of this type is applied to an automobile, tractor, tank or oil well drill, the power of same is determined only by the speed of the inertia mass.

Kinetic coupling of the driving and driven shafts. The expression "acceleration and deceleration curves", as used in the following description of kinetic couplings of the driving and driven shafts, is applied to the path traced by points 5, 15 and 25, shown on Figs. 1, 2 and 3, respectively. These acceleration and deceleration curves, on which the invention is based and on the character of which the smoothness of work and the efficiency of the device is dependent, are obtained by the use of different combinations of an internal gear, an external gear and an eccentric on which either one of the gears is mounted free to rotate and in mesh with the other gear.

Suitable acceleration and deceleration curves are also obtained by the use of two external gears, one of which is mounted eccentrically with the driving shaft of the conversion medium and is in mesh with the concentrically mounted gear.

The following types of kinetic couplings are based on these combinations and are used in the embodiments of conversion mediums: Type 1. Kinetic coupling of the driving and driven shafts by means of an external gear mounted eccentrically and in mesh with an external gear concentric with the driving shaft. Type 2. Kinetic coupling of driving and driven shafts by means of an internal gear mounted on an eccentric and in mesh with an external gear concentric with the driving shaft. Type 3. Kinetic coupling of the driving and driven shafts by means of an external gear mounted on an eccentric and in mesh with an external gear concentric with the driving shaft.

These kinetic couplings may be used in different ways in regard to the location on driving and driven shafts, different ratios and relative speeds of the gears, which enable to obtain acceleration and deceleration curves of different characters of which one or an infinite number may be used in the embodiment of the power conversion medium.

*Kinetic coupling described in type 1*

Two external gears in mesh, with one mounted concentrically and the other eccentrically with the driving shaft of the conversion medium.

As shown in diagram of Fig. 1, this kinetic coupling of the driving and driven shafts may be incorporated in a power conversion medium in two different ways, as follows: First by an external gear mounted eccentrically free to rotate and in mesh with a stationary external gear; secondly by an external gear mounted eccentrically free to rotate and in mesh with an external gear, which rotates with a constant angular velocity. The character of the acceleration and deceleration curves traced by pin 7 on gear 3, varies as follows:

The first case gives epycicloids for all ratios of gears different than unity. When the ratio is unity, the curve becomes a cordioid; and in the second case gives a curve similar to the first but elongated or shortened, the elongation and shortening being dependent on the chosen angular velocity of the concentrically mounted gear and its direction of rotation. The character of the curves may be changed also by locating the connecting pin 7 inside or outside the periphery of external gear 3, respectively shortening or lengthening the acceleration path of the pin.

In order to make the function of this kinetic coupling of the driving and driven shafts of the conversion medium clear, the following description of the motion is given for the first case, when the concentrically mounted gear is stationary. (The reaction of the gears is absorbed mechanically by the housing of the torque adjuster, by means of over-running clutches 34 and 35, shown in Figs. 6, 7, 8 and 9, on which are mounted gears 42 and 43, above referred to.)

For the sake of simplicity, the diagram shown in Fig. 1 represents both charging and discharging sides of the kinetic coupling and must be considered in conjunction with Fig. 4. Reference character 1 designates the center of the driving and driven shafts of the conversion medium, 2 designates the center of external gear 3, which is in mesh with external gear 4. Gears 3 and 4 in Fig. 1 correspond to gears 42 and 44 respectively on Fig. 4, during accelerating period of inertia mass, and to gears 43 and 46 respectively during decelerating period of the same mass.

Gear 3 is mounted free to rotate on center 2, which rotates around center 1 in common with driving shaft velocity and direction. External gear 4 is stationary.

During one turn of the driving shaft, center 2 makes one turn in same direction and a fixed point 5 on the periphery of gear 3 traces a curve 5, 5a, 5b, 5c and 5, which is a cordioid for the given ratio of gears. The velocity of point 5, moving in direction shown, is zero at 5, approaches maximum at 5a, and is maximum at 5b.

Point 5 is the center of a pin 7, which is fixed to the periphery of gear 3, and slides freely in a slot 8 of an inertia mass 6 mounted free to rotate on center 1. During one turn of the driving shaft, inertia mass 6 is accelerated from zero angular velocity at point 5 to a maximum at 5b. At an assumed point 5c center 2 of gear 3 is at 2a and center 5 is at 5c and is beginning to decelerate. At this position the inertia mass has obtained a maximum angular velocity and the torque exerted by it is transmitted to gear 3 at its position 3a, turning it around its axis at 2a and turning gear 4 through an angle α in accordance with the resisting torque.

The angular displacement of the driven shaft of the conversion medium is inversely proportional to the resisting torques, consequently at high resisting torques small angular displacements of the driven shaft are obtained and at low resisting torques greater angular displacements are obtained.

The above description is for one unit with one inertia mass, which utilizes the work done by the engine during a part of a revolution of the driving shaft of the prime mover. But it is obvious that combining more units or inertia masses the work during a complete revolution may be utilized.

In order to obtain uniform and balanced rotation of the driven shaft of the torque adjuster, a greater number of inertia masses may be employed, reducing their weights for the utilization of the work done by the prime mover during a fractional part of a turn.

*Kinetic coupling described in type 2*

Internal gear mounted on eccentric and in mesh with external gear.

As shown in diagram of Fig. 2.

This kinetic coupling of the driving and driven shafts may be incorporated in a power conversion medium in three different ways, as follows: First by internal gear mounted free to rotate on an eccentric and in mesh with an external gear, which is stationary; secondly by internal gear mounted free to rotate on an eccentric and in mesh with an external gear, which rotates with constant angular velocity; and lastly by internal gear mounted free to rotate on an eccentric and in mesh with an external gear, which rotates with the changeable speed of the driven shaft.

The character of the acceleration and deceleration curves traced by point 15 of gear 13 in each of these cases, varies as follows:

The first case gives a constant curve, which is an epitrochoid. The second case gives a curve similar to the first but elongated, the elongation being dependent on chosen constant angular velocity of the external gear. The third case gives an infinite number of curves, which vary from an epitrochoid to a circle, when the angular velocity of the driven shaft becomes equal to that of the driving shaft.

The character of the curves, for each of the three cases, may further be changed by changing the ratio of gears. The curve becomes longer when the ratio approaches unity.

More particularly the character of the curves for each of the three cases may be changed by locating the fixed point 15 inside, on or outside the periphery of the internal gear 13. This way the path of the pin is shortened or lengthened.

In order to make the function of this kinetic coupling of the driving and driven shafts clear, the following description of the motion is given for the third case, for one phase, when the external gear is connected to the driven shaft and is at starting moment stationary. (The reaction of gears, being less than the driving impulse, results in loss of efficiency of the device.)

Reference character 11, Fig. 2, designates the center of the driving and driven shafts. 12 designates a point which rotates around center 11 with common driving shaft velocity and direction.

When the driving shaft rotates in clockwise direction, internal gear 13 revolves freely on point 12 and rolls with its periphery around the periphery of the external gear 14. A fixed point 15 on the periphery of internal gear 13, during one and a fraction of a revolution of the driving shaft, traces a curve 15, 15a, 15b, 15c and 15d. The velocity of point 15, moving in direction shown, is zero at 15 and 15d, maximum of 15b and of intermediate value at 15a.

Point 15 is connected by means of a like 18 to a fixed point 17 on inertia mass 16, which is mounted free to rotate on center 11 of the driving shaft and which is accelerated from zero angular velocity at point 17 to a maximum at point 17b.

When the inertia mass 16 has obtained a maximum angular velocity at 17b, internal gear 13 is in position 13a and the velocity of point 15, which has reached position 15b, remains constant for a short period and then begins to decelerate.

Point 17, when it has reached position 17b, has also reached its maximum angular velocity. At position 15c point 15 begins to decelerate and the torque exerted by mass 16 is transmitted to internal gear 13, by means of link 18, turning it and external gear 14 through an angle α in accordance with the resisting torque.

The angular displacement of the driven shaft is inversely proportional to the resisting torque, consequently, at high resisting torques small angular displacements of the driven shaft are obtained and at low resisting torques greater angular displacements are obtained.

The above description is for one unit with one inertia mass, which utilizes the work done by the engine during a part of a revolution of the driving shaft. It is obvious, that combining several units or several inertia masses, the full work done during one revolution of the driving shaft of the engine may be utilized and several driving impulses and uniform rotation obtained.

*Kinetic coupling described in type 3*

External gear mounted on eccentric and in mesh with internal gear. As shown in diagram of Fig. 3.

This kinetic coupling of the driving and driven shafts may be incorporated in a power conversion medium in three different ways as follows: First, by external gear mounted free to rotate on an eccentric and in mesh with an internal gear, which is stationary; second, by external gear mounted free to rotate on an eccentric and in mesh with an internal gear, which rotates with a constant angular velocity; and lastly, by reason of the external gear mounted free to rotate on an eccentric and in mesh with an internal gear, which rotates with the changeable speed of the driven shaft. The character of the acceleration and deceleration curves traced by point 25, on the periphery of gear 24, in each of these cases varies as follows:

The first case gives a constant curve, which is an hypotrochoid for gear ratios less than 2:1. The second case gives a curve similar to the first but elongated. The elongation is dependent on the chosen constant angular velocity of the internal gear. The third case gives an infinite number of curves, which vary, for ratios less than 2:1, from an hypotrochoid to an infinite number of differently elongated hypotrochoids.

The character of the curves, for each of the three cases may be changed by changing the ratio of gears. For ratios less than 2:1, the curves are hypotrochoids. The ratio 2:1 cannot be considered at all. At a ratio more than 2:1, the curves become hypocycloids and at a ratio of 4:1 the curve is an astroid. The character of the curves may be changed by locating the fixed point 25 on, inside or outside the periphery of the external gear 24. This way the path of the pin is shortened or lengthened.

In order to make the function of this kinetic coupling of the driving and driven shafts clear, the following description of the motion is given for the third case, for one phase, when the internal gear is mounted on the driven shaft and is at starting moment stationary. (The reaction of gears, being less than the driving impulse, results in loss of efficiency of the device.)

Reference character 21, Fig. 3, designates the center of the driving and driven shafts. 22 designates a point which rotates around center 21 in common with driving shaft angular velocity and direction. When the driving shaft rotates in clockwise direction, external gear 24 revolves freely on point 22 and rolls with its periphery around the periphery of internal gear 23. A fixed point 25, on the periphery of external gear 24, during one revolution of the driving shaft, traces a curve 25, 25a, 25b, 25c, and 25d. The velocity of point 25, moving in direction shown, is zero at 25, maximum at 25b, zero at 25c and of intermediate value at 25d. Point 25 is connected by means of link 28 to a fixed point 27 on inertia mass 26, which is mounted free to rotate on center 21 of the driving shaft and which is accelerated from zero angular velocity at point 27 to a maximum at 27b.

When the inertia mass 26 has obtained a maximum angular velocity at 27b, external gear 24 is in position 24a and point 25, which has reached position 25b, starts to decelerate. At this point the torque exerted by inertia mass 26 is transmitted from point 27, which is located at 27b, by means of link 28 to point 25 at its location at 25b on the periphery of the external gear 24 and turning gear 24 turns gear 23 through an angle α in accordance with the resisting torque.

The angular displacement of the driven shaft is inversely proportional to the resisting torque, consequently, at high resisting torques small angular displacements of the driven shaft are obtained and at low resisting torques greater angular displacements are obtained. The above description is for one unit with one inertia mass, which utilizes the work done by the engine during one-half of a revolution of the driving shaft. But it is obvious that combining two units or two inertia masses, the full work per revolution may be utilized and two driving impulses obtained. In order to obtain uniform and balanced rotation of the driven shaft, a greater number of inertia masses may be employed, reducing the weight of same for the utilization of the work done during a fraction of a turn of the driving shaft.

The embodiment in conversion mediums of kinetic couplings shown in graph, Fig. 1, are shown mechanically in Figs. 4, 5, 10, and 11.

With reference now to Figs. 4 and 5, reference character 31 designates the driving shaft of the conversion medium. Disk 32 is keyed to shaft 31. Shaft 33 rests in disk 32 free to rotate. To shafts 33 are keyed overrunning clutches 34 and 35. On clutches 34 and 35 are external gears 42 and 43, respectively. Clutch 34 is capable of gripping when the angular velocity of gear 42 exceeds that of shaft 33 and releasing when the angular velocity of shaft 33 exceeds that of gear 42. Clutch 35 is capable of gripping when the angular velocity of shaft 33 exceeds that of gear 43 and releasing when the angular velocity of gear 43 exceeds that of shaft 33. Gear 42 is in mesh with gear 44, which is keyed to the hub of the housing 45. Gear 43 is in mesh with gear 46, which is keyed to the hollow driven shaft 47. Clutch 34 has a pin 48, which fits in a radial slot 49 in a flywheel 50. Flywheel 50 is mounted free to rotate on the hub of the housing 45.

The charging mechanism consists of parts 31, 32, 33, 42, 44, 48 and overrunning clutch 34 with its parts as shown on Figs. 6 and 7. The discharging mechanism consists of parts 43, 46, 47 and an overrunning clutch 35 with its parts as shown on Figs. 8 and 9. The inertia mass consists of a flywheel 50 with a radial slot 49.

As shown in Figs. 10 and 11, gear 44 is rotating with an angular velocity of a constant ratio with the angular velocity of the driving shaft of the conversion medium. The rotation of gear 44 is obtained through a gear train 51, 52, 53 and 54. Gear 51 is keyed to driving shaft 31. Gears 52 and 53 are keyed to shaft 55, which is mounted free to rotate in housing 45. Gears 54 and 44 are keyed to hollow shaft 56. Parts 51, 52, 53, 54, 55 and 56 are added to parts of the charging mechanism, shown on Figs. 4 and 5. The discharging mechanism is the same as shown on Figs. 4 and 5. The inertia mass is the same as on Figs. 4 and 5.

On Figs. 6 and 7 is shown overrunning clutch 34. The body of the clutch 34 has grooves 39 in which are rollers 36. In each of the grooves are two nests 41 in which are springs 37. The rollers are held in place by rings 38, which are fastened to the body of clutch 34 and on which the outer ring of the clutch is fitted to rotate freely when released from the body of clutch 34. The left ends of grooves 39 are deeper than the right ends and the slope between these ends is a gradual one. When the body of clutch 34 is rotating in assumed direction shown with an angular velocity higher that that of the outer ring, the rollers are in the deep ends of grooves 39 and the outer ring is released to revolve freely on rings 38. When outer ring is rotating in assumed direction shown with an angular velocity exceeding that of the body of clutch 34, the rollers 36 are near the shallow ends of grooves 39 and are gripping the body of clutch 34, rotating it in direction shown. Springs 37 are for moving the rollers in gripping position. In Figs. 8 and 9 is shown an overrunning clutch 35, identical in details to that shown on Figs. 6 and 7, with the exception that the grooves 40 are reversed, which naturally results in reversed functioning.

In order to further explain the function of the conversion mediums, a description of the same for that shown in Fig. 2 is here given. The function of the conversion mediums as shown in Figs. 4 and 5, having been described, and their operation being similar to the function of conversion mediums type 1 and 3, the description of the latter is deemed unnecessary.

Type 2 case 1, represented by Figs. 12 and 13, the shaft 61, if actuated by an electric motor or internal combustion engine, will rotate eccentrics 62 and 63, on which internal gears 64 and 65 are mounted free to rotate. Gear 64, being in mesh with stationary external gear 66, rolls around the external gear 66. Overrunning clutch 35, which is keyed to the internal gear, gripping ring 70, renders it the motion of internal gear 64.

Pin 73, which is fastened to ring 70, traces a curve as given on Fig. 2. Pin 73, by means of link 72 and pin 76 Fig. 13, is connected to flywheel 74, which is mounted free to rotate on shaft 61. The accelerated motion of pin 73, during the first half of the curve Fig. 2 accelerates the flywheel 74, storing up as energy the work done by the engine during one-half of a revolution of the driving shaft. The motion of the pin during the second half of the curve Fig. 2 is decelerating, but being connected to flywheel 74, which has acquired a maximum speed, is forced to move with the speed of same, releasing clutch 35 and turning ring 70 on internal gear 64.

Gear 65, being in mesh with external gear 67, which is keyed to hollow driven shaft or sleeve 69, rolls around gear 67. Ring 71, being released by means of overrunning clutch 34, shown in Figs. 6 and 7, from internal gear 65, and being connected to flywheel by means of pins 73 and 76 and link 72 Fig. 13, follows the accelerated motion of the flywheel.

The stored up energy of flywheel 74 (during the second half of the revolution of the driving shaft), which is connected to ring 71, turns same and clutch 34. Clutch 84 is gripping internal gear 65, turns same on its eccentric. Gear 65, being engaged with external gear 67, turns same through an angle in accordance with the resistance on shaft 69.

The described conversion mediums utilizes one-half of the work done per one revolution of the driving shaft. In order to utilize the full work done, two conversion mediums should be embodied in a torque adjuster.

The charging mechanism consists of parts 61, 62, 64, 66, 70, 72, 73, 76 and clutch 35, as shown in Figs. 8 and 9; while the discharging mechanism consists of parts 63, 65, 67, 69, 71, 72, 73, 76 of clutch 34, as shown in Figs. 6 and 7. The inertia mass consists of parts 73, 76 and 74.

*Type 2, case 2, Figs. 14 and 15.*—Now referring to the function of conversion mediums, type 2, case 2, it is similar to that of type 2, case 1, with the exception that gear 66, which is stationary in case 1, rotates with a constant speed, through gear train 80, 81, 82 and 83, gear 80 is keyed to driving shaft 61. Gears 81 and 82 are keyed to shaft 84, which is mounted free to rotate in housing 68. Gear 83 is keyed to the sleeve 85 to which the gear 66 is also keyed. By giving gear 66 a constant speed, the curve traced by pin 73 becomes longer, which results in higher angular velocity of the flywheel.

The flywheel is brought to a full stop in case 1 and in case 2 it is not brought to a full stop, which results in smoother and more balanced functioning of the device. Parts 80, 81, 82, 83, 84 and 85 are added to the charging mechanism, which is identical to and consists of same parts as shown on Figs. 12 and 13. The discharging mechanism is identical to that shown on Figs. 12 and 13. The inertia mass is identical with that shown on Figs. 12 and 13.

*Type 2, case 3, Figs. 16 and 17.*—The function of conversion mediums type 2, case 3, is similar to that of cases 1 and 2, with the exception that gear 67 in case 3 takes the place of 66 and 67 in cases 1 and 2. Gear 67, being keyed to driven shaft 69, rotates with the changeable speed of same, which results in acceleration curves of different characters. The charging and discharging mechanisms are combined in one, and are represented by parts 63, 75, 67, 72 and 73. The inertia mass comprises parts 73 and 74 and 76.

The reaction of the internal gear, during the flywheel acceleration period, is absorbed by the driven shaft, which results in loss of efficiency of the device.

Referring to Fig. 3, the embodiment in conversion mediums of kinetic coupling type 3 are shown in Figs. 18, 19, 20, 21, 22 and 23.

Referring to Figs. 18 and 19. Reference character 91 designates the driving shaft of the conversion medium. Eccentrics 92 and 93, of same size and eccentricity, are keyed to shaft 91 with axes pointing in opposite directions. Overrunning clutches 35 and 34 are mounted free to rotate on eccentrics 92 and 93 respectively. On clutches 35 and 34 are external gears 94 and 95 respectively. Clutch 35, as shown on Figs. 8 and 9, is capable of gripping in the direction of rotation of gear 94, when the angular velocity of gear 94 exceeds that of clutch body 35 and releasing when the angular velocity of clutch body 35 exceeds that of gear 94. Internal gear 96 is keyed to the hub of housing 97 and in mesh with gear 94. Clutch 34, shown on Figs. 6 and 7, is capable of gripping in the direction of rotation of clutch body 34, when its angular velocity exceeds that of gear 95, and releasing when the angular velocity of gear 95 exceeds that of clutch body 34. Internal gear 98 is keyed to driven shaft 99 of the conversion medium and in mesh with gear 95. The bodies of clutches 34 and 35 are connected by means of links 101 and pins 102—103 to flywheel 100, which is mounted free to rotate on shaft 91. The charging mechanism consists of parts 91, 92, 94, 96, 101, 103 and clutch 35, shown on Figs. 8 and 9. The discharging mechanism consists of parts 93, 95, 98, 99, 101, 103 and clutch 34, shown on Figs. 6 and 7. The inertia mass consists of parts 100 and 102.

With reference to Figs. 20 and 21, gear 96 is rotating with an angular velocity of a constant ratio to the angular velocity of the driving shaft 91 of the conversion medium. The rotation of gear 96 is obtained through a gear train 110, 111, 112, 113 and 114 and the direction of rotation is opposite to that of the driving shaft. Gear 110 is keyed to driving shaft 91 and is in mesh with gear 111, which is mounted free to rotate on shaft 115, mounted free to rotate in housing 97. Gear 111 is in mesh with gear 112, which is keyed to shaft 116. Shaft 116 is mounted free to rotate in housing 97. To shaft 116 is keyed gear 113, which is in mesh with gear 114. Gear 114 is keyed to the hub of internal gear 96. Parts 110, 111, 112, 113, 114, 115, and 116 are added to the charging mechanism, which is identical to and consists of the same parts as shown on Figs. 18 and 19. The discharging mechanism is the same as on Figs. 18 and 19.

The inertia mass is the same as per Figs. 18 and 19.

Now referring to Figs. 22 and 23. Gear 98 is keyed to driven shaft 99 of the conversion medium and has the changeable speed of same. The charging and discharging mechanisms are combined in one and are represented by parts 93, 98, 101, 102, 103 and 104.

With reference to Figs. 24, 25 and 26. The described types of conversion mediums may be incorporated in an automatic torque adjuster in series of two. For the utilization of the full work done by the prime mover during one turn of the driving shaft, not less than two conversion mediums should be used. In order to obtain balanced rotation of the driven shaft, four or more conversion mediums should be employed. On Figs. 24, 25 and 26 is shown an embodiment in an automatic torque adjuster of four conversion mediums, type 2, case 2.

Reference character 120 designates the driving shaft of the torque adjuster, which may be coupled by any customary type of rigid coupling to the driving shaft of the engine. To shaft 120 is keyed gear 121, which is in mesh with gears 122, keyed to the driving shafts 61 of the conversion mediums. On the driving shafts 61 are four conversion mediums 123 with their drives, shown in detail on Figs. 12, 13, 14 and 15. On the driven shafts 69 of the conversion mediums 123 are keyed gears 124, which are in mesh with gears 125, keyed to the driven shaft 126 of the torque adjuster.

To the same shaft 126 is keyed flywheel 127, which serves for equalizing the driving impulses.

Each conversion medium is delivering one driving impulse per turn of the driving shaft 61, and, therefore, the eccentrics of the conversion mediums should be equally spaced on the periphery of the shaft with axes pointing in opposite directions. The assembly of parts of the torque adjuster are mounted in housing 128 and its cover 129.

In accordance with the provisions of the patent statutes, I have herein described the principle and operation of my invention, together with the apparatus which I now consider to represent the best embodiment thereof, but I desire to have it understood that the apparatus shown is only illustrative, as has been pointed out, and that the invention can be carried out by other means. Also, while it is designed to use the various features and elements in the combination and relations described, some of these may be altered and others omitted without interfering with the more general results outlined, and the invention extends to such use.

Having thus fully described the invention, what I claim as new and desire to secure by Letters Patent is:

1. In combination with driving and driven members, mechanism for transmitting power from said driving to said driven member, said mechanism including a rotatable inertia mass and kinetic couplings between said inertia mass and driving member, said inertia mass and driven member, said couplings comprising a plurality of intermeshed external gears and two eccentrics upon which two of said gears are rotatably mounted.

2. The construction defined in claim 1, two of said gears being internal gears intermeshing with external gears.

3. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, both of said gears of the charging mechanism being external gears, the eccentrically mounted gears being rotatable, and the concentrically mounted gear being stationary in character.

4. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, both of said gears of the charging mechanism being rotatable external gears, and said concentrically mounted gear being adapted to rotate at a constant angular velocity.

5. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, said eccentrically disposed gear of the charging mechanism being a rotatable internal gear and the other gear being a stationary external gear.

6. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, said eccentrically disposed gear of the charging mechanism being a rotatable internal gear and the other gear being an external gear adapted to rotate at substantially constant angular velocity.

7. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, said driving member adapted to rotate at substantially constant speed and said driven member adapted to rotate at a variable speed, and said eccentrically disposed gear being a rotatable internal gear and the other gear being an external gear which rotates at the variable speed of the driven member.

8. In combination with driving and driven members, mechanism for transmitting power from said driving to said driven member, said mechanism including a rotatable inertia mass, a charging mechanism and a discharging mechanism, said mechanisms including a pair of intermeshing gears, one of said gears being mounted concentrically with said driving member and the other gear being eccentrically disposed relative to said driving member, said eccentrically disposed gear of the charging mechanism being a rotatable external gear and the other gear being a stationary internal gear.

9. Apparatus of the character described comprising a housing, a driving shaft, a hollow driven shaft into which said driving shaft extends, alined housing hubs disposed on opposite sides of said housing and through which said shafts extend, a disk mounted on said shaft and keyed thereto, a rotatable shaft journaled in and extending through said disk, an overrunning clutch securely mounted on each end of said rotatable shaft, an external gear mounted on each of said clutches; one of said clutches being adapted to grip its corresponding gear when the angular velocity of the latter exceeds that of the rotatable shaft and to release said gear when the angular velocity of the latter is less than that of the rotatable shaft; the other of said clutches being adapted to grip its corresponding gear when the angular velocity of the latter is less than that of the rotatable shaft and to release said gear when the angular velocity of the latter exceeds that of the rotatable shaft; a stationary gear mounted on the hub of said housing in meshing relationship with one of said external gears; another gear securely mounted on said driven shaft and intermeshed with the other of said external gears; a fly wheel mounted to rotate freely on the hub of said housing adjacent one set of intermeshing gears, said fly wheel being provided with a radial slot, a pin extending from the clutch associated with said set of gears into said slot, said pin describing a curved path during each revolution of said driving shaft, the characteristics of said curved path being variable in accordance with the relationship between the elements of said gearing system.

10. The apparatus defined in claim 9, wherein the stationary gear mounted on the hub of the housing is rotatably mounted concentrically with driving shaft, and a train of gears interconnecting said driving shaft and said concentric gear.

11. Apparatus of the character described comprising a housing, a driving shaft, a hollow driven shaft into which said driving shaft extends, alined housing hubs on opposite sides of said housing and through which said shafts extend, a pair of eccentrics of equal size and eccentricity securely mounted on said driving shaft within said housing and in spaced relation to each other, an internal gear mounted free to rotate on each of said eccentrics, a stationary external gear mounted on one of said housing hubs and disposed in intermeshing relationship with one of said internal gears, a second external gear securely mounted on said driven shaft and disposed in intermeshing relationship with the other of said internal gears, a ring mounted on each of said internal gears, an overrunning clutch between each said internal gear and the ring mounted thereon; the clutch adjacent said stationary external gear being adapted to grip its corresponding ring in the direction of rotation of its corresponding internal gear when the angular velocity of said internal gear exceeds that of the corresponding ring and to release said ring when the angular velocity of the latter exceeds that of the coacting internal gear, while the other clutch is adapted to grip its corresponding ring in the direction of rotation of the latter when the angular velocity of said ring exceeds that of its coacting internal gear and to release said ring when the angular velocity of the latter is less than that of its coacting gear; an inertia wheel mounted to rotate on said driving shaft; and pin and link means connecting said rings to said wheel at substantially diametrically opposite points on the latter.

12. Apparatus of the character described comprising a housing, a driving shaft and a driven shaft, and means in said housing for interconnecting said shafts, said means comprising a flywheel rotatably mounted on said driving shaft, means for transmitting energy from said driving shaft to said flywheel comprising an internal gear free to rotate on eccentrics and a stationary external gear mounted on said housing in concentric relation to said driving shaft and intermeshed with said internal gear, and means for transmitting energy from said flywheel to said driven shaft comprising an internal gear free to rotate on eccentric and an external gear mounted on and secured to said driven shaft and disposed concentrically of said driving shaft and in intermeshing relation with said last-named internal gear.

13. Apparatus of the character described comprising a housing, a driving shaft and a driven shaft, a sleeve on said driving shaft, and means in said housing for interconnecting said shaft, said means comprising a flywheel rotatably mounted on said driving shaft, means for transmitting energy from said driving shaft to said flywheel comprising an internal gear mounted free to rotate on one eccentric housing, and a rotatable external gear mounted in concentric relation to said sleeve and intermeshed with said internal gear, a train of gearing interconnecting said rotatable external gear and said driving shaft, and means for transmitting energy from said flywheel to said driven shaft comprising an internal gear free to rotate on an eccentric and an external gear mounted on and secured to said driven shaft and disposed concentrically of said driving shaft and in intermeshing relation with said last-named internal gear.

14. Apparatus of the character described comprising a housing, a driving shaft and a driven shaft, and means in said housing for interconnecting said shafts, said means comprising an external gear mounted on and secured to said driven shaft and disposed concentrically around said driving shaft, a plurality of flywheels mounted to rotate freely on said driving shaft, and an internal gear free to turn on eccentrics on said driving shaft, said gears being intermeshed, and pin and link means interconnecting said internal gear and flywheel.

15. Apparatus of the character described comprising a housing, a driving shaft, a hollow driven shaft into which said driving shaft extends, alined housing hubs on opposite sides of said housing and through which said shafts extend, a pair of eccentrics of equal size and eccentricity securely mounted on said driving saft within said housing and in spaced relation to each other, an external gear free to rotate on each of said eccentrics, a stationary internal gear mounted on one of said housing hubs and disposed in intermeshing relationship with one of said external gears, a second internal gear securely mounted on said driven shaft and disposed in intermeshing relationship with the other of said external gears, an overrunning clutch between each external gear and its eccentric, an inertia wheel mounted to rotate on said driving shaft between said eccentrics, and pin and link means connecting said rings to said wheel at substantially diametrically opposite points; one of said clutches being adapted to grip when the angular velocity of its corresponding gear exceeds that of the clutch body and to release when the angular velocity of said clutch body exceeds that of said corresponding gear, and the other of said clutches being adapted to grip when its angular velocity exceeds that of its coacting gear and to release when the angular velocity of the latter exceeds that of said other clutch.

16. Apparatus of the character described comprising a housing, a driving shaft and a driven shaft, and means in said housing for interconnecting said shafts, said means comprising a flywheel rotatably mounted on said driving shaft, means for transmitting energy from said driving shaft to said flywheel comprising an external gear mounted free to rotate on said driving shaft eccentrically thereof and a stationary internal gear mounted on said housing concentrically of said driving shaft and intermeshed with said external gear, clutches adapted to grip and release its corresponding gear at times when angular velocity is greater or less than its coacting part, and means for transmitting energy from said flywheel to said driven shaft comprising an internal gear keyed to said driven shaft and concentrically disposed relative to said driving shaft and an external gear mounted free to rotate on eccentric on said driving shaft eccentrically thereof and intermeshed with said last-named internal gear.

17. Apparatus of the character described comprising a housing, a driving shaft and a driven shaft, and means in said housing for interconnecting said shafts, said means comprising a flywheel rotatably mounted on said driving shaft, means for transmitting energy from said driving shaft to said flywheel comprising an external gear mounted free to rotate on eccentric on said driving shaft eccentrically thereof and a rotatable internal gear mounted concentrically of said driving shaft and intermeshed with said external gear, a train of gears interconnecting said driving shaft and said rotatable internal gear, and means for transmitting energy from said flywheel to said driven shaft comprising an internal gear keyed to said driven shaft and concentrically disposed relative to said driving shaft and an external gear mounted free to rotate on an eccentric on said driving shaft eccentrically thereof and intermeshed with said last-named internal gear.

18. Apparatus of the character described comprising a housing, a driving shaft and a driven shaft, and means in said housing for interconnecting said shafts, said means comprising an internal gear mounted on and secured to said driven shaft and disposed concentrically around said driving shaft, a plurality of flywheels mounted to rotate freely on said driving shaft, and an external gear mounted free to rotate on an eccentric on said driving shaft between said flywheel and internal gear, said gears being intermeshed, and pin and link means interconnecting said internal gear and flywheel.

OTTO F. KENDLER.